June 18, 1940.  R. C. BAKER  2,204,648

PACKING FOR WELL DEVICES

Filed May 5, 1939

Inventor
REUBEN C. BAKER,
By Oscar A. Mellin
Attorney

Patented June 18, 1940

2,204,648

UNITED STATES PATENT OFFICE 2,204,648

PACKING FOR WELL DEVICES

Reuben C. Baker, Coalinga, Calif., assignor to Baker Oil Tools, Inc., Huntington Park, Calif., a corporation of California Application May 5, 1939, Serial No. 271,941

8 Claims. (Cl. 166—12)

The present invention relates to packing structures, and more particularly to well packing structures including rubber or similar materials exposed to comparatively high pressures or temperatures.

In oil field practice, natural or synthetic rubber packings and the like are subjected to high temperatures and static pressures, which produce the cold flowing of the packing material through any open hole or space between the well packer and the casing within which it is placed. This cold flowing often continues to such a great extent as to result in the eventual substantially complete displacement and dissipation of the packing material from the region where it should effect a desired seal with the walls of the casing. Accordingly, it is an object of the present invention to provide a packing structure capable of effectively withstanding high temperatures and static pressures, thereby presenting a maximum packing surface for effective sealing contact with the walls of a confining enclosure under such extreme conditions of operation.

The invention has other objects that will become apparent from a consideration of several of its applications shown in the drawing accompanying and forming part of the present invention. These applications will now be described in detail, but it is to be understood that such detailed description is not to be taken in a limited sense, since the scope of the invention is best defined by the appended claims.

Referring to the drawing.

Non-metallic packings are usually secured to a comparatively rigid body for expansion against a confining body upon application of pressure to the packing. A clearance gap is usually provided between the packing retainer and the walls of a confining enclosure, which is bridged by the packing upon application of pressure thereto. The presence of this gap permits the cold flowing of the non-metallic packing therethrough under the influence of pressures or temperatures, finally resulting in a substantial, if not complete, loss of the packing from the region where the sealing action with the confining enclosure is most desired. By means of the present invention, such cold flowing of the rubber material is prevented by encircling the packing where it is fastened to its retainer with an annulus of a pliable but relatively non-resilient material, capable of being deformed radially toward contact with its confining body and remaining in that position upon application of pressure to it and the non-metallic packing which it envelops. The material chosen has very little tendency toward cold flowing, and by virtue of its being deformed from its initial position to one in which it bridges the gap between the retainer and the walls of the confining member, it will prevent the non-metallic rubber or other packing from flowing through that gap, and consequently ensures that the packing will provide an effective seal in the required region.

Figure 1:
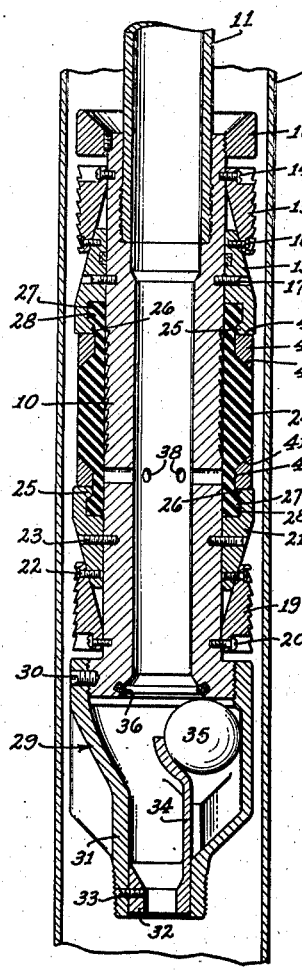
Figure 1 is a longitudinal sectional view of the invention embodied in a well packer shown positioned within a well casing.
Figure 2:
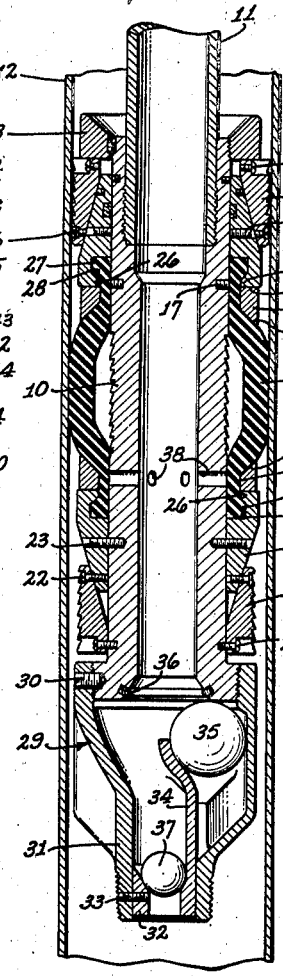
Figure 2 is a view similar to Figure 1, with the upper slips in set position.
Figure 3:
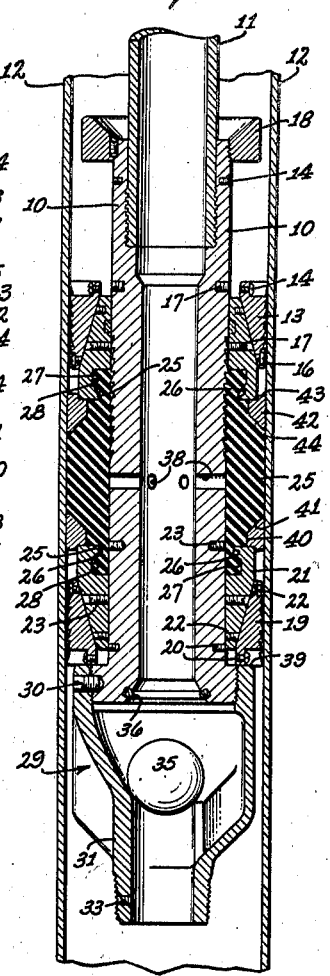
Figure 3 is a view similar to Figure 1, with both the upper and lower slips in set position.

Referring to Figures 1 to 3, the invention is shown applied to a well packer in the form of a cement retainer. The main body 10 of the packer is suitably connected to a running-in string 11 by which it can be lowered to the desired position within the bore or casing, 12. The packer carries a plurality of upper annular segmental slips 13 secured to the body by shear screws 14, and to an upper expander cone 15 by shear screws 16, the cone in turn being initially secured to the body by a plurality of shear screws 17. Upward travel of the segmental slips is limited by a setting ring 18 secured to the body.

A lower set of segmental slips 19 is circumferentially arranged around the body and secured thereto by shear screws 20. These slips are also attached to a lower expander cone 21 by a plurality of shear screws 22, which cone is initially fastened to the body by a plurality of shear screws 23.

A natural or synthetic rubber packing sleeve 24 encircles the body and is secured at its opposite ends to the cones by means of inturned flanges 25, 25 on the cones received within mating grooves 26, 26 near the terminal portions of the sleeve, such portions being provided with outwardly directed flanges 27, 27 seating within internal grooves 28, 28 in the cones defined partly by their inwardly directed flanges.

A valve assembly 29 is threadedly or otherwise secured to the lower end of the body and is further held in place by a lock screw 30. This assembly includes a housing 31 carrying a tripping ball seat 32 through the agency of a shear screw 33. Extending upwardly from this seat is an arm 34 initially holding a back pressure ball 35 in ineffective position against the sides of the assembly housing, and preventing it from seating against the lower end 36 of the body whenever reverse flow of fluid tends to occur.

In operation, circulation is first established through the packer, and a tripping ball 37 is then dropped or pumped down through the run-in string until it seats upon the tripping ball seat 32, to prevent further passage of fluid through the packer (see Figure 2). Pressure is then built up within the body, causing fluid to pass through the ports 38 in the body and expand the rubber sleeve 24 against the walls of the confining casing. An upward force will also be exerted causing the cone 15 to shear its confining screws 17 and move upwardly on the body, shearing the slip screws 14, 16 and moving the slips 13 radially into engagement with the casing 12 and against the setting ring 18.

The pressure within the string and body will then be built up to a greater degree to shear the screw 33 holding the tripping ball seat unit 32 and forcing that member and its associated tripping ball 37 downwardly from the packer, thereby re-establishing circulation through the tool and releasing the back pressure ball 35 for subsequent contact with the seat 36 in the lower end of the body. The taking of an upward strain on the run-in string 11 will move the body 10 upwardly to compress the non-metallic or rubber sleeve 24 between the body and the casing and provide an effective seal therebetween (see Figure 3). The continuance of this upward strain will produce a shearing of the screws 20, 22, 23 holding the slips and cone together and to the main body, causing a shoulder 39 at the lower end of the body and on the valve housing, to engage the bottom of the slips 19 and move them upwardly along the tapered face of the cone 21 to force the lower slips radially into gripping engagement with the casing. The well packer is now held in position for the performance of the desired operation.

It will be noted that an annular space exists between the walls of the casing and the exterior of the cones retaining the non-metallic packing sleeve. As aforementioned, the subjecting of the packing sleeve to high pressures, such as are encountered within the casing and which are added to by the compression of the packing upon the taking of a strain on the run-in string, tends to force the packing into this annular space. Under many operating conditions, this cold flowing of the packing is of such a great extent as to permit leakage of fluid, and in extreme cases results in complete dissipation of the packing material between the cones.

In accordance with the present invention, cold flowing of the packing material is prevented by providing an external groove 40 in each end of the sleeve adjacent its restrainer rings or cones, which groove is preferably a continuation of the flange receiving groove 26, being defined by the end of a cone and the bevelled or inclined side 41 in the rubber packing. An annulus 42 of pliable or relatively non-resilient material is inserted within this annular groove, having sides 43, 44 respectively opposed to the end of the cone 15 or 21 and the bevelled side 41 of the packing. The outer surface of the ring 42 is initially substantially flush with the periphery of the sleeve.

The restrainer rings 42 can be made from several materials, among which are lead, tin, copper, and soft bronze. Due to its relatively low cost it is proposed to use lead, although it is to be understood that elements, compounds, and various materials other than those specifically mentioned can be used for the desired purpose so long as they possess the requisite characteristics.

Upon application of pressure to the rubber packing 24, whether it be due to fluid pressure passing through body ports 38 or that attending the mechanical compression of the sleeve by taking the upwardly directed strain on the tubing, each lead annulus 42 will be stretched and deformed outwardly to bridge the gap between its associated cone and the walls of the casing (see Figure 3). The deformation of the rubber sleeve into contact with the walls of the casing is accordingly not attended with cold flowing of the rubber beyond the retainer cones in view of the barrier presented by the restrainer rings of lead, or other material having similar characteristics. The pliable but relatively non-resilient lead rings have very little tendency to flowing beyond the cones, even upon being subjected to extremely high pressures and to temperatures below the melting point of the particular material being used.

Figure 4:
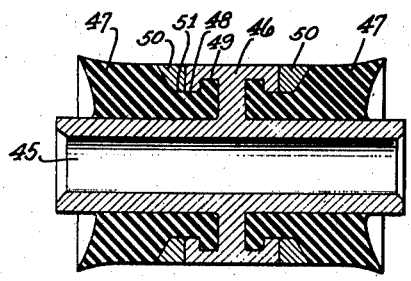
Figure 4 is a longitudinal sectional view through another embodiment of the invention.

The restrainer rings 42 can be used in other applications than well packers. A piston is disclosed in Figure 4, including a main body 45 having a central flange 46 and non-metallic packing elements 47, 47 on opposite sides thereof. The adjacent ends of the flange and each packing element are interlocked by the mutual cooperation between their respective mating flanges 48, 49, cold flowing of each packing element beyond the flange being prevented by a pliable, inelastic or malleable ring 50 of lead or the like fitting within a packing groove 51 and embracing the packing. This lead annulus functions in the same manner as was described in connection with Figures 1 to 3.

I claim:

1. A packing structure, including a non-metallic packing adapted to engage the walls of a confining enclosure, retainer means to which said packing is secured, said packing being provided with a circumferential recess defining a groove between it and said retainer means, and a pliant, inelastic annulus in said groove encircling and embracing said packing to prevent its passage between said retainer means and enclosure.

2. A packing structure, including a non-metallic packing adapted to engage the walls of a confining enclosure, retainer means to which said packing is secured, said packing being provided with a circumferential recess defining a groove in conjunction with said retainer means, a side wall of said recess being inclined outwardly away from said retainer, and a pliant, inelastic annulus in said groove embracing said packing, said annulus having a side wall opposed to and contiguous said inclined packing wall.

3. In a well packer having a plurality of slips adapted to be engaged with the walls of a casing by a conical expander; the combination therewith of a non-metallic packing sleeve adapted to engage the walls of said casing and having an end secured to said expander, and a pliant, malleable annulus surrounding and embracing the end of said packing adjacent said expander and adapted to be expanded outwardly by said packing to bridge the annular space between said expander and casing.

4. In a well packer having upper and lower sets of slips adapted to be engaged with the walls of a casing by respective upper and lower conical expanders of materially less diameter than said casing; the combination therewith of a non-metallic packing sleeve secured to both of said expanders, and a pliant, malleable annulus surrounding said packing adjacent each of said expanders and adapted to be expanded outwardly by said packing to bridge the annular space between said expander and casing.

5. A well packer, including a rubber packing adapted to be engaged with the walls of a casing and having an external flange defining an external groove, retainer means having an inturned flange within said groove, said flange defining an internal groove receiving said external flange, and a pliant, malleable annulus adjacent said retainer means received within said packing groove and adapted to be expanded outwardly by said packing to bridge the annular space between said retainer means and casing.

6. A well packer, including a rubber packing having a portion adapted to engage the walls of a casing and a terminal reduced portion having an outwardly directed flange defining a groove between it and said wall engaging portion, retainer means having an inwardly directed flange filling part of said groove, said retainer flange defining an internal groove receiving said external flange, and a pliant, malleable annulus adjacent said retainer means filling the remainder of said packing groove, the external diameter of said annulus being initially substantially equal to the external diameter of said wall engaging packing portion.

7. A well packer, including a rubber packing having a portion adapted to engage the walls of a casing and a terminal reduced portion having an outwardly directed flange defining a groove between it and said wall engaging portion, retainer means having an inwardly directed flange filling part of said groove, said retainer flange defining an internal groove receiving said external flange, the wall of said packing groove adjacent said casing engaging portion being inclined outwardly away from said retainer means, and a pliant, malleable annulus contiguous said retainer means filling the remainder of said packing groove with a side wall opposed to and contiguous said inclined packing wall.

8. A well packer, including a body, an elongate, non-metallic packing sleeve surrounding said body for engagement with the walls of a casing in which said packer is adapted to be run, anchoring means carried by said body and secured to one end of said packing, and a pliant, inelastic ring encircling and embracing the end of said packing adjacent said anchoring means, said anchoring means having substantial clearance with the walls of said casing, and said ring being distortable and movable bodily outwardly by said elongate packing to bridge the clearance space between said anchoring means and casing, whereby to prevent passage of said packing sleeve through said space.

REUBEN C. BAKER.